(12) United States Patent
Korcz et al.

(10) Patent No.: US 8,633,385 B2
(45) Date of Patent: Jan. 21, 2014

(54) WEATHERPROOF COVER HAVING BIDIRECTIONAL HINGE

(75) Inventors: Krzysztof W. Korcz, Grainger, IN (US); Mahran H. Ayrton, South Bend, IN (US)

(73) Assignee: Hubbell Incorporated, Shelton, CT (US)

( * ) Notice: Subject to any disclaimer, the term of this patent is extended or adjusted under 35 U.S.C. 154(b) by 433 days.

(21) Appl. No.: 12/942,521

(22) Filed: Nov. 9, 2010

(65) Prior Publication Data

US 2012/0111597 A1    May 10, 2012

(51) Int. Cl.
- H02G 3/14      (2006.01)
- H05K 5/03      (2006.01)
- E05F 1/14      (2006.01)
- E05F 1/08      (2006.01)
- E05D 3/10      (2006.01)

(52) U.S. Cl.
USPC ............... 174/67; 174/66; 16/282; 16/287; 16/367

(58) Field of Classification Search
USPC .......... 174/66, 67, 53; 16/265, 282, 287, 302, 16/366, 367, 342; 49/192; 361/679.27, 361/733; 220/241, 244
See application file for complete search history.

(56) References Cited

U.S. PATENT DOCUMENTS

| | | |
|---|---|---|
| 872,694 A | 12/1907 | Thiem |
| 3,474,569 A | 10/1969 | Grant |
| 3,564,112 A | 2/1971 | Algotsson et al. |
| 3,654,663 A | 4/1972 | Algotsson |
| 3,690,035 A | 9/1972 | Schindlauer |
| 4,109,095 A | 8/1978 | Kling et al. |
| 4,381,063 A | 4/1983 | Leong |
| 4,456,145 A * | 6/1984 | Frank .......................... 220/830 |
| 4,484,021 A | 11/1984 | Schaefer et al. |
| 4,505,403 A | 3/1985 | Bowden et al. |
| 5,280,135 A | 1/1994 | Berlin et al. |
| 5,348,383 A | 9/1994 | Ritt |
| 5,456,377 A | 10/1995 | Williams, Jr. |
| 6,133,531 A | 10/2000 | Hayduke et al. |
| 6,619,723 B2 * | 9/2003 | Duffy ............................ 16/290 |
| 6,806,426 B1 | 10/2004 | Gretz |
| 6,872,887 B2 | 3/2005 | Shotey et al. |
| 6,886,713 B1 | 5/2005 | Scherrer |
| 6,894,223 B1 | 5/2005 | Shotey et al. |
| 6,921,861 B1 | 7/2005 | Gretz |
| 7,129,413 B1 | 10/2006 | Rao et al. |
| 7,176,379 B2 | 2/2007 | Shotey et al. |
| 7,191,491 B2 * | 3/2007 | Ibaraki et al. ................... 16/367 |

(Continued)

OTHER PUBLICATIONS

Definition of "couple" by www.meriam-webster.com May 22, 2013.*

*Primary Examiner* — Chau Nguyen
*Assistant Examiner* — Roshn Varghese
(74) *Attorney, Agent, or Firm* — Garrett V. Davis; Mark S. Bicks; Alfred N. Goodman

(57) ABSTRACT

A weatherproof cover assembly includes a base and a cover where the cover is coupled to the base by a bidirectional hinge to allow the cover to pivot in two directions. The cover assembly can be mounted in a horizontal or vertical orientation where the bidirectional hinge allows the cover to close downwardly when the assembly is mounted in either orientation. The bidirectional hinge has a first leg pivotally connected to the cover and second leg pivotally connected to the base where the first and second legs are perpendicular to each other.

18 Claims, 6 Drawing Sheets

(56) References Cited

U.S. PATENT DOCUMENTS

| | | |
|---|---|---|
| 7,282,643 B2 | 10/2007 | Maltby et al. |
| 7,345,238 B1 | 3/2008 | Shotey et al. |
| 7,348,486 B1 | 3/2008 | Shotey et al. |
| 7,396,997 B2 | 7/2008 | Dinh |
| 7,598,453 B1 | 10/2009 | Shotey et al. |
| 7,619,162 B2 | 11/2009 | Dinh et al. |
| 7,669,289 B2 | 3/2010 | Shih et al. |
| 7,763,799 B2 | 7/2010 | Johnson |
| 7,968,794 B1 * | 6/2011 | Baldwin .......... 174/67 |
| 2005/0082081 A1 | 4/2005 | Marcou et al. |
| 2005/0138774 A1 * | 6/2005 | Gan .......... 16/367 |
| 2009/0211779 A1 | 8/2009 | Drane |
| 2009/0223021 A1 | 9/2009 | Endo et al. |
| 2010/0181091 A1 | 7/2010 | Drane |

\* cited by examiner

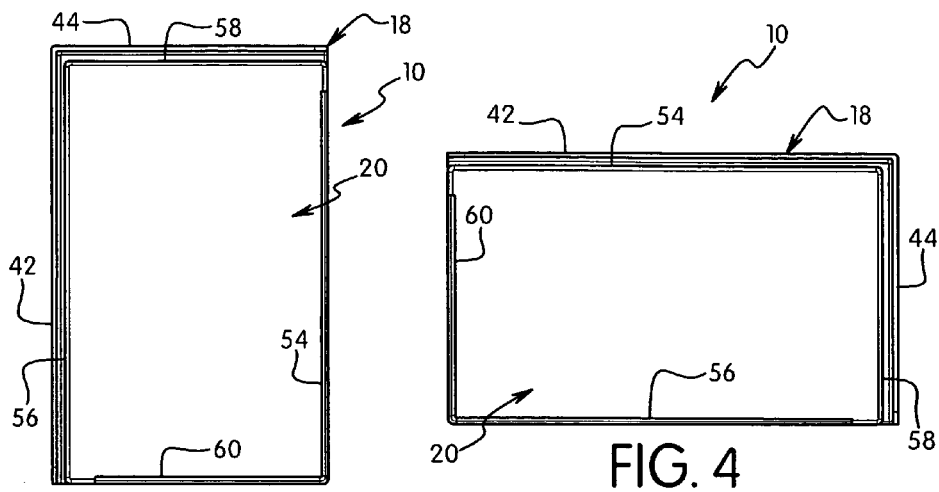
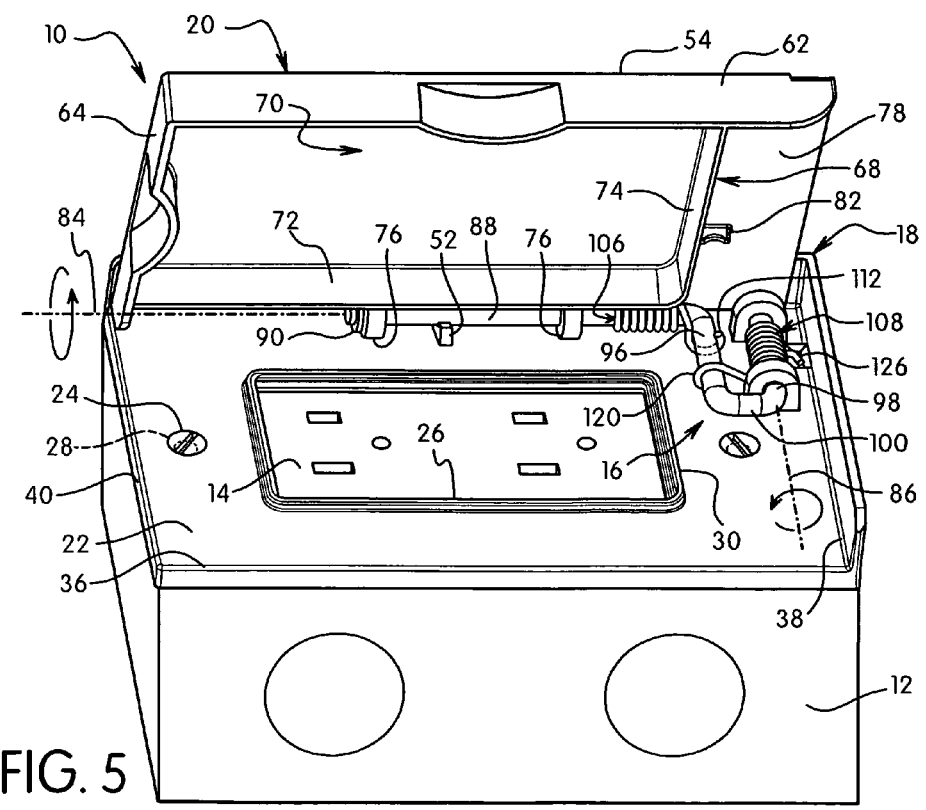

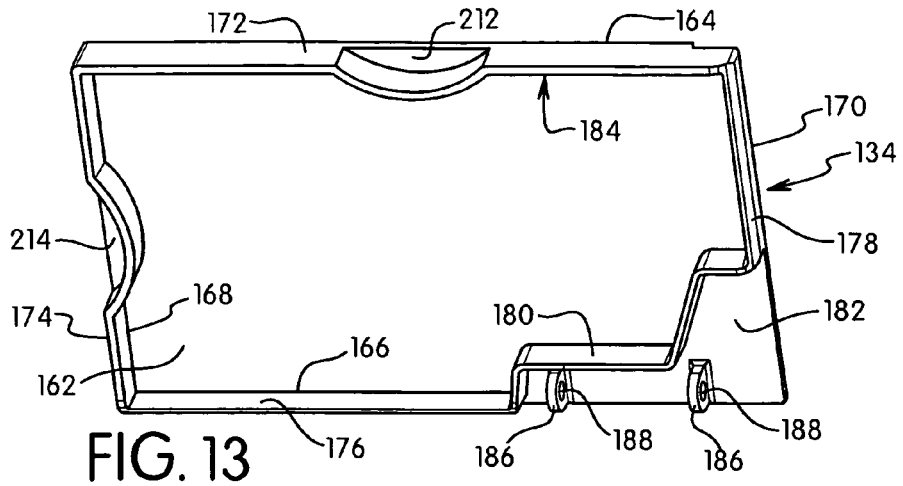
FIG. 13
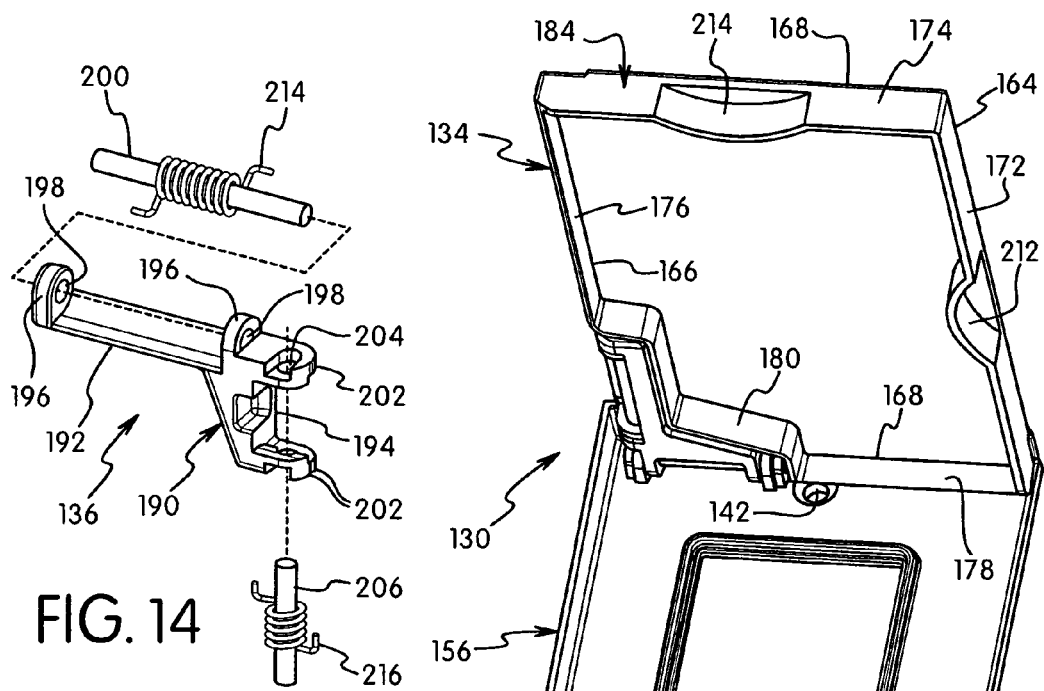
FIG. 14
FIG. 15

WEATHERPROOF COVER HAVING BIDIRECTIONAL HINGE

FIELD OF THE INVENTION

The present invention is directed to a weatherproof cover assembly having a cover coupled to a base by a hinge that allows the cover to pivot about two different axes. The present invention is particularly directed to a cover assembly suitable for an electrical wiring device having a bidirectional hinge between a cover and base.

BACKGROUND OF THE INVENTION

Weatherproof covers are generally required by building codes for electrical devices that are used outside and exposed to the weather. The covers are required to close automatically when not in use to protect the electrical components from rain water.

Many designs of covers have been made that include a spring member to close automatically. Examples of this type of cover are disclosed in U.S. Pat. No. 4,484,021 to Schaefer et al., U.S. Pat. No. 4,505,403 to Bowden et al., and U.S. Pat. No. 4,109,095 to Kling et al.

For convenience and ease of manufacture, weatherproof covers have been produced with a cover member that is hinged to a housing and can close by gravity. Examples of this type of cover as disclosed in U.S. Pat. No. 5,280,135 to Berlin et al., U.S. Pat. No. 4,381,063 to Leong, and U.S. Pat. No. 5,456,377 to Williams, Jr.

The weatherproof covers generally include a single hinge connecting the cover to the housing. The single hinge allows the cover assembly to be mounted in one direction only. Several weatherproof cover assemblies have also been produced that include two or more sets of hinges on the cover and the housing. The cover can be attached to the housing using one of the sets of hinges that allow the assembly to be mounted in more than one orientation. Examples of this type of cover assembly are shown in U.S. Pat. No. 6,891,104 to Dinh, U.S. Pat. No. 7,282,643 to Maltby et al., U.S. Pat. No. 7,348,486 to Shotey et al., U.S. Pat. No. 7,345,238 to Shotey et al., U.S. Pat. No. 6,872,887 to Shotey et al., and U.S. Pat. No. 7,176,379 to Shotey et al. These covers have the disadvantage of requiring the selection of the proper set of hinges and/or removal of the unused hinges prior to assembly and installation.

Cover devices have also been proposed for electrical outlets that have a housing having a corner portion and cover hinged to the housing by a hinge positioned in the cover of the housing and a corner of the cover. The hinge is mounted so that the axis of rotation of the hinge is diagonal with respect to the sides of the housing and the cover. Examples of this type of cover are also disclosed in U.S. Pat. No. 6,133,531 to Hayduke et al., U.S. Pat. No. 7,129,413 to Rao et al. and U.S. Pat. No. 7,598,452 to Shotey et al.

U.S. Pat. Nos. 6,806,426 and 6,921,861 to Gretz disclose a two-way electrical box cover. The cover assembly includes a base, a middle member and an outer member. The middle member has a substantially rectangular shape corresponding to the shape of the base and the cover. The middle member is hinged to the base by a hinge pin so that the cover and the middle member can pivot about a first axis. The cover is connected to the middle member by a hinge pin to enable the cover to pivot about a second axis with respect to the base and the middle member where the second axis is perpendicular to the first axis.

While these devices have been generally suitable for the intended purpose, there is a continuing need in the industry for an improved cover assembly for an electrical wiring device that is suitable for outdoor use.

SUMMARY OF THE INVENTION

The present invention is directed to a weatherproof cover assembly for an electrical component. The present invention is particularly directed to a weatherproof cover assembly suitable for use in wet locations that can be attached to an electrical box in a horizontal position or in a vertical position.

The weatherproof cover assembly of the invention is simple and easy to manufacture and assemble. The weatherproof cover assembly basically includes a base, a cover and a hinge coupling the cover to the base where the cover can pivot in two different directions without requiring removal of unused hinge members and without assembling the correct hinge members on the cover and base.

One aspect of the invention is to provide a weatherproof cover assembly where the cover is able to pivot about two different perpendicular axes using a single hinge. The hinge can include one or more spring members to bias the cover to the closed position about each axis.

Another aspect of the invention is to provide a weatherproof cover assembly where a single hinge assembly couples the cover to the base while enabling the cover to pivot in a first direction and in a second direction perpendicular to the first direction thereby allowing the cover assembly to be mounted in a vertical orientation or a horizontal orientation.

Another aspect of the invention is to provide a weatherproof cover having a hinge with a first leg and a second leg perpendicular to the first leg. The first leg is connected to the cover so that the cover can pivot in a first direction. The second leg is connected to the base so that the cover can pivot in a second direction. A spring can be mounted on the first leg to engage the second leg to bias the cover in a closed position. A second spring can be mounted on the second leg to engage the first leg to bias the cover to a closed position.

In one embodiment, a weatherproof cover assembly is provided having a cover, a base and a bidirectional hinge connecting the cover to the base. The bidirectional hinge has a first leg that receives a first hinge pin to connect to the cover and a second leg that receives a second hinge pin to connect to the base.

These and other aspects and features of the invention are basically attained by providing a weatherproof cover assembly with a base adapted for coupling to an electrical box or electrical wiring device. The base has an opening for receiving the electrical wiring device. A movable cover member has a shape and dimension to mate with the base to cover the electrical wiring device in a closed position. A hinge member has a first leg pivotally connected to the cover member to enable the cover to pivot between an open position and a closed position about a first axis. A second leg is pivotally connected to the base to enable the cover to pivot between an open position and a second position about a second axis that is perpendicular to the first axis. The cover assembly is adapted for mounting in a horizontal orientation or in a vertical orientation where the cover closes downwardly in either orientation.

The various aspects and advantages of the invention are further attained by providing a weatherproof cover assembly having a base adapted for coupling to an electrical box or an electrical wiring device. The base has an opening for receiving the electrical wiring device, a first side and a second side that is at least substantially perpendicular to the first side. The first side has a first hinge support. A movable cover has a shape and dimension to mate with the base to cover the electrical wiring device in a closed position. The cover has a first side aligned with the first side of the base and a second side that is at least substantially perpendicular to the first side and aligned with the second side of the base. The second side of the cover has a second hinge support. A hinge member has a first leg pivotally coupled to the first hinge support and second leg that is at least substantially perpendicular to the first leg and pivotally coupled to the second hinge support. The cover assembly is adapted to mount in a horizontal orientation or in a vertical orientation.

The aspects and advantages of the invention are also attained by providing a weatherproof cover assembly for an electrical wiring device. The cover assembly has a base adapted for coupling to an electrical box or to the electrical wiring device. The base has an opening with a dimension to receive the electrical wiring device, a first side and a second side. The first side has a first hinge support. A movable cover has a shape and dimension to mate with the base to cover the electrical wiring device and the opening in the base when in a closed position. The cover has a first side aligned with the first side of the base and a second side aligned with the second side of the base. The second side of the cover has a second hinge support. A hinge member has a first leg pivotally coupled to the first hinge support. The first leg has a first free end and a second end. The hinge member further includes a second leg oriented substantially perpendicular to the first leg. The second leg has a first portion and a second portion. The first and second portions are substantially perpendicular to the first leg and the second portion is pivotally coupled to the second hinge support. The cover assembly is adapted for mounting in a horizontal orientation or a vertical orientation and the cover can close downwardly in either orientation.

These and other objects, advantages and aspects of the invention will become apparent from the following detailed description of the invention which, in conjunction with the annexed drawings, disclose various embodiments of the invention.

BRIEF DESCRIPTION OF THE DRAWINGS

The following is a brief description of the drawings, in which:

FIG. 3 is a front view of the weatherproof cover assembly mounted in a vertical orientation;

FIG. 4 is a front view of the weatherproof cover assembly mounted in a horizontal position;

FIG. 5 is a front perspective view showing the weatherproof cover assembly with the cover pivoted in a first direction;

FIG. 13 is a bottom perspective view of the cover of the assembly of FIG. 11;

FIG. 14 is a perspective view of the hinge insert and hinge pins; and

FIG. 15 is a perspective view showing the cover assembly of FIG. 11 with the cover pivoted in a second direction.

DETAILED DESCRIPTION OF THE INVENTION

Figure 1:
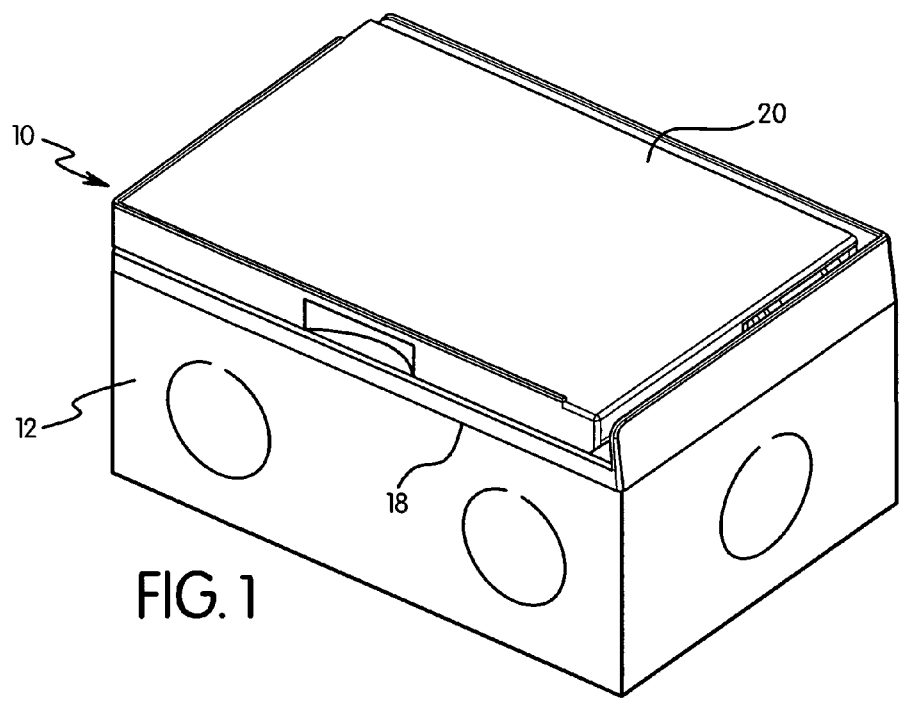
FIG. 1 is a perspective view of the weatherproof cover assembly of the invention showing the front and right side of the assembly.
Figure 2:
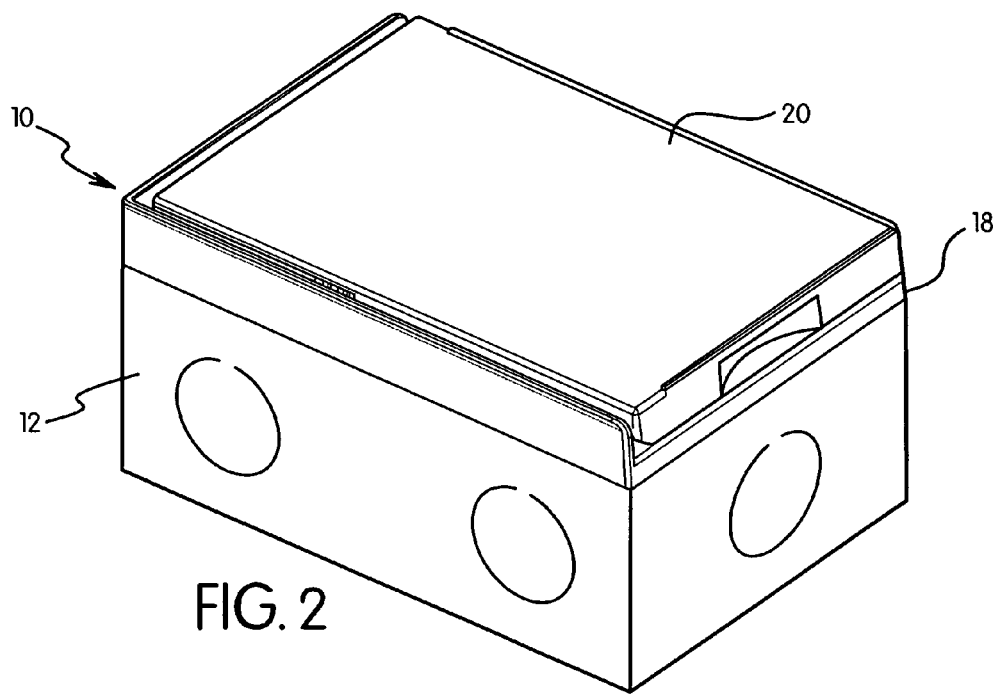
FIG. 2 is a perspective view of the weatherproof cover assembly showing the rear and left side view of the assembly.

The present invention is directed to a weatherproof cover assembly having a cover coupled to a base by a hinge that allows the cover to pivot about two different axes with respect to the base. The invention is particularly directed to a cover assembly having a bidirectional hinge member for connecting the cover to the base. In one embodiment of the invention, the hinge has one part that is pivotally connected to the base and another part that is pivotally connected to the cover.

Referring to the drawings, the weatherproof cover assembly 10 is adapted for connecting to an electrical box 12 and/or to an electrical wiring device 14 such as a duplex receptacle as shown in FIG. 5. The cover assembly is particularly adapted for mounting in either a horizontal orientation or a vertical orientation.

The cover assembly 10 of the invention includes a bidirectional hinge 16 to enable the cover assembly to be mounted in a vertical orientation as shown in FIG. 3 or a horizontal orientation as shown in FIG. 4 so that the cover closes automatically in a downward direction in either orientation so that rain water can be directed away from the electrical wiring device. Preferably, the cover assembly 10 is mounted so that one pivot axis of the hinge is horizontal so that the cover closes in a downward direction.

Electrical box 12 can be a standard electrical box having mounting tabs (not shown) for supporting the wiring device 14 and suitable knock-outs or pry-outs for connecting the electrical wiring. The electrical box 12 can be mounted within the wall cavity with the top end flush with the wall surface so that the weatherproof cover assembly 10 is flush with the outer surface of the wall. Alternatively, the electrical box 12 can be a weatherproof electrical box for mounting directly to the outer surface of a support structure. Typically, the electrical box is mounted in or onto a wall so that the cover assembly faces outward.

Weatherproof cover assembly 10 as shown in the Figures, includes a base 18 and a cover 20. Hinge 16 connects the cover 20 to the base 18 and enables the cover to pivot with respect to the base about two different axes. In the embodiment shown, the hinge pivots about two perpendicular or substantially perpendicular axes with respect to the base.

Figure 9:
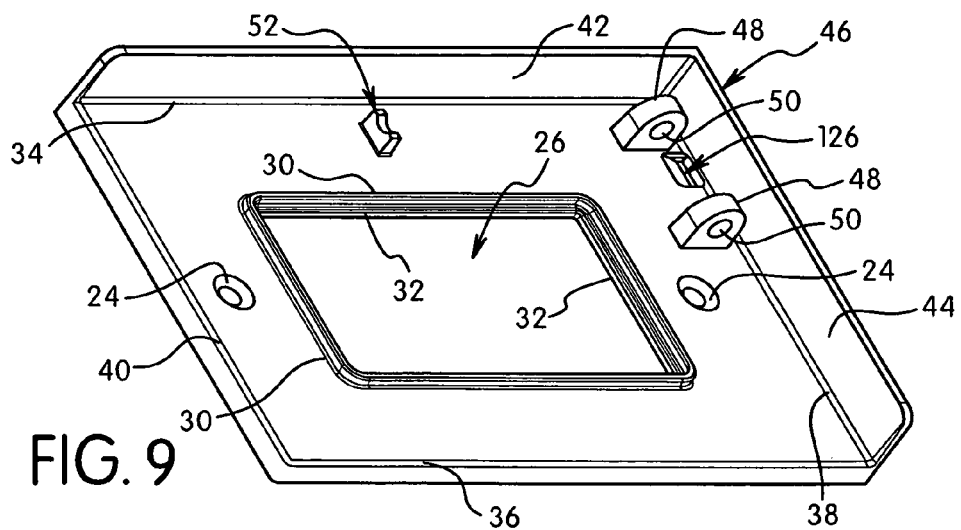
FIG. 9 is a top perspective view of the base of the cover assembly.
Figure 10:
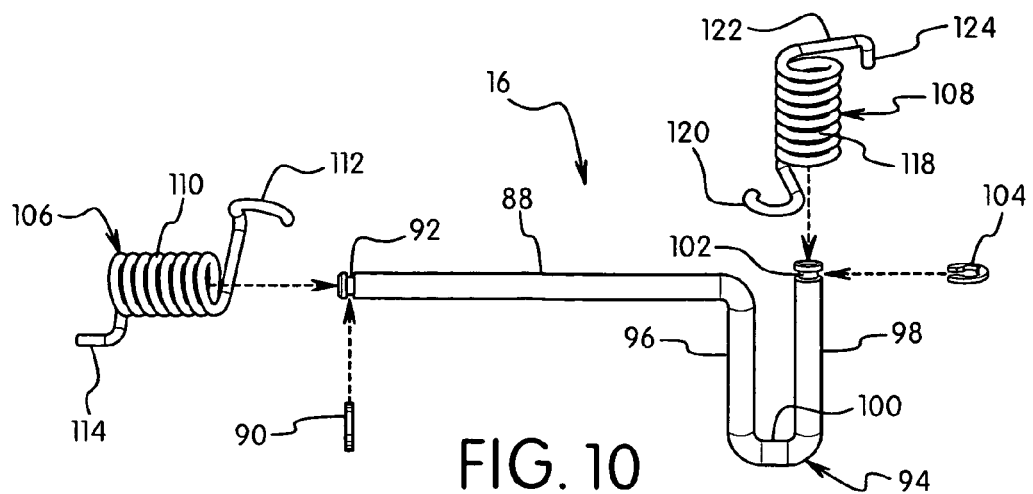
FIG. 10 is an exploded view of the hinge and spring assembly in one embodiment of the invention.

In the embodiment illustrated, the cover assembly 10 has a substantially rectangular shape and a dimension to be mounted to the open end of the electrical box 12. As shown in FIGS. 5 and 9, the base 18 has a substantially planar top surface 22 with screw holes 24 and an opening 26 for receiving the electrical wiring device 14. The screw holes 24 are aligned with screw holes in the mounting tabs in the electrical box or threaded holes in the mounting straps of the electrical wiring device 14. Mounting screws 28 are threaded into the mounting tabs or the electrical wiring device to secure the cover assembly to the electrical box.

Opening 26 in base 18 in the embodiment shown is centrally located for receiving the wiring device 14. The opening 26 can be provided in other locations depending on the wiring device. A collar 30 extends upwardly from the top face 22 in a direction substantially perpendicular to the plane of the base 18. The collar 30 has a height and dimension to deflect water away from the wiring device 14 and the opening 26. As shown in FIG. 9, opening 26 has an undercut lip 32 on the bottom side of the collar 30 around the opening to mate with the top surface of the wiring device 14.

In the embodiment illustrated, base 18 has a substantially rectangular configuration with longitudinal sides 34 and 36 and transverse ends 38 and 40. Longitudinal side 34 includes a first flange 42 extending outwardly from the plane of base 18 and having a length extending the length of the base. A flange 44 extends outwardly from the plane of the base 18 and has a length extending the transverse end 38. In one preferred embodiment, flange 42 is coupled directly to flange 44 to form a weatherproof wall or shield 46 extending along two contiguous sides of the base that correspond to a top edge of the base when mounted in the vertical position of FIG. 3 and a top edge when mounted in the horizontal position of FIG. 4. Preferably, the flange 42 and flange 44 are substantially perpendicular to the plane of the base 18. A pair of raised bosses 48 extend upwardly from the base 18 adjacent the flange 44. Each boss 48 includes a hole 50 to receive the hinge 16. A hinge support member 52 extends upwardly from the base 18 adjacent the flange 42.

Figure 8:
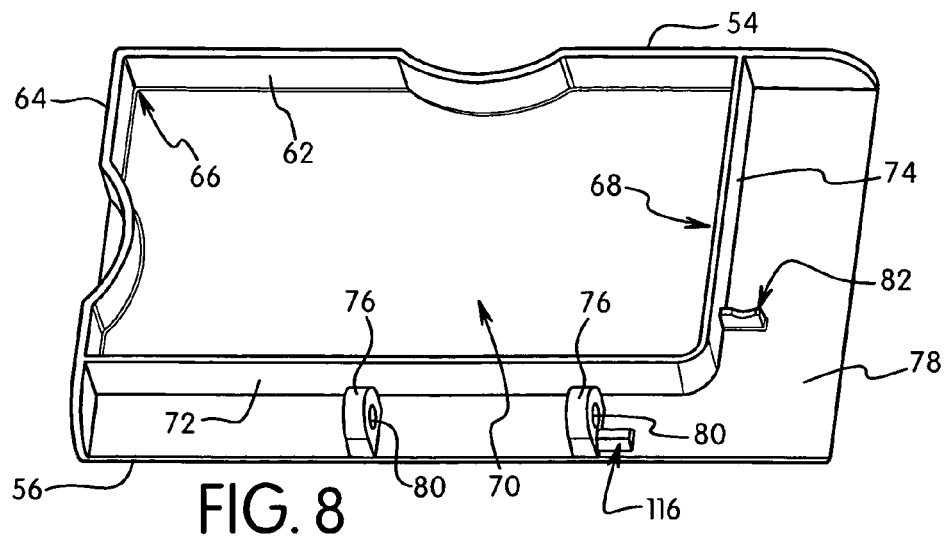
FIG. 8 is a bottom perspective view of the cover of the assembly.

The cover 20 has a shape and dimension to complement the base 18 to cover the base and the wiring device 14 when the cover is in the closed position. Cover 20 has a substantially rectangular shape corresponding to the shape and dimension of the base 18. As shown, cover 20 has longitudinal sides 54 and 56 and transverse ends 58 and 60. A flange 62 extends along the longitudinal side 54 and a flange 64 extends along the transverse end 58. Flanges 62 and 64 are joined together to form a continuous weatherproof shield 66 extending along the two contiguous sides of the cover. Preferably, the flange 62 and flange 64 are substantially perpendicular to the plane of the cover 20. The shield 66 covers the open bottom and open side of the base when mounted in the vertical position shown in FIG. 3 and the horizontal position shown in FIG. 4. As shown in FIG. 8, an inner flange 68 extends from the flange 62 to the flange 64 to define a substantially rectangular shaped cavity 70. The inner flange 68 has a first wall 72 and a second wall 74 that are spaced inwardly from the longitudinal side 56 and the transverse side 60. The inner flange 68 is positioned to overlie the base 18 and encircle the opening 26 in the base when the cover is in the closed position. The first flange 62, second flange 64 and the inner flange 68 form a continuous wall and a weatherproof enclosure around the opening 26 and the wiring device 14 to direct rain water away from the opening in the base. Preferably, the inner flange 68 is substantially perpendicular to the plane of the cover 20.

As shown in FIG. 8, a pair of upstanding bosses 76 extend from the inner face 78 of cover 20. Each boss 76 has a hole 80 for receiving the hinge 16. As shown, the hinge bosses 76 are positioned adjacent the longitudinal side edge 56 and are positioned outside the cavity 70 defined by the inner flange 68 and the flanges 62 and 64. A hinge support member 82 is provided adjacent the wall 74.

The hinge 16 is adapted for coupling the cover 20 to the base 18 to allow the cover to pivot about two different axes with respect to the base. The two axes are at an angle to each other so that the cover can selectively pivot in different directions. In one embodiment as shown, the two pivot axes of the hinge are substantially perpendicular to each other. In other embodiments, the two pivot axes are less than or greater than 90°.

Figure 6:
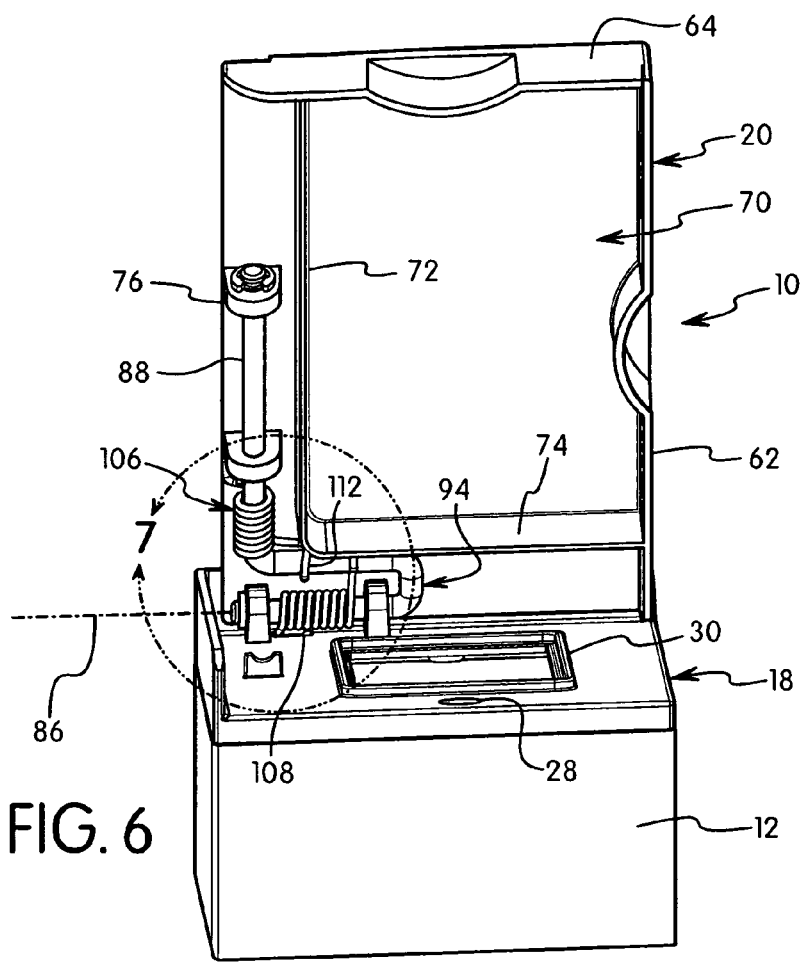
FIG. 6 is a front perspective view of the weatherproof cover assembly showing the cover pivoted in a second direction.

The hinge 16 in the embodiment shown is adapted for pivoting the cover 20 along a first axis 84 as shown in FIG. 5 when the cover assembly is mounted in a horizontal position and along second axis 86 as shown in FIG. 6 when the assembly is mounted in a vertical position. In the embodiment illustrated, hinge 16 has a first leg 88 forming a first pivot pin that is received in the bosses 76 and retained in place by a C-clip 90 which is received in the annular recess 92. The hinge has a substantially L-shape with a second leg 94 at one end of the first leg 88. The second leg 94 is oriented substantially perpendicular to the axis of the first leg 88. In the embodiment illustrated, the second leg 94 has a substantially U-shape formed by a first portion 96 and a second portion 98. The first and second portions are substantially parallel to each other and connected by a connecting portion 100. In the embodiment shown, the connecting portion 100 is spaced from the first portion and substantially parallel thereto. In other embodiments, the first and second portions can be coupled directly to the first portion.

The second portion 98 has a terminal end with an annular recess 102 for receiving a clip 104. As shown in FIGS. 5 and 6, the second portion 98 is received in the bosses 48 on the base for pivoting movement and secured by the C-clip 104. The first leg 88 is pivotally connected to the cover 20 to allow the cover to pivot about the first axis 84 with respect to the base 18 and the hinge 16. The second portion 98 of the second leg 94 is coupled to the base 18 to enable the cover to pivot about the second axis 86 with respect to the base 18. In one embodiment of the invention, the hinge 16 and the cover 20 pivot as a unit with respect to the base 18 along the second axis 86. As shown in FIG. 4, the first leg 88 is received in the hinge support 52 when the cover is in the closed position. The first portion 96 of the second leg 98 is received in the hinge support 82 on the cover 20.

The weatherproof cover assembly 10 of the invention is capable of protecting the electrical wiring device 14 from rain water by shedding water away from the wiring device and the opening in the base. The cover assembly and the electrical box are typically mounted on a wall or other support surface so that the wiring device faces outwardly. A waterproof gasket (not shown) is positioned between the cover assembly and the electrical box. The cover assembly can be mounted in a vertical position shown in FIG. 3 with the flange 64 of the base oriented along the top side and the flange 62 extending vertically. The cover 20 can be opened by pivoting upwardly on the cover to pivot the cover and the hinge 16 to the open position shown in FIG. 6. The weatherproof cover assembly 10 can also be mounted in a horizontal position shown in FIG. 4 with the flange 62 along the longitudinal side 54 oriented along the top edge and the flange 64 extending along the side edge. The cover can also be opened by pivoting the cover upwardly by pivoting the cover along the axis 84 of the hinge 16 as shown in FIG. 5.

Figure 7:
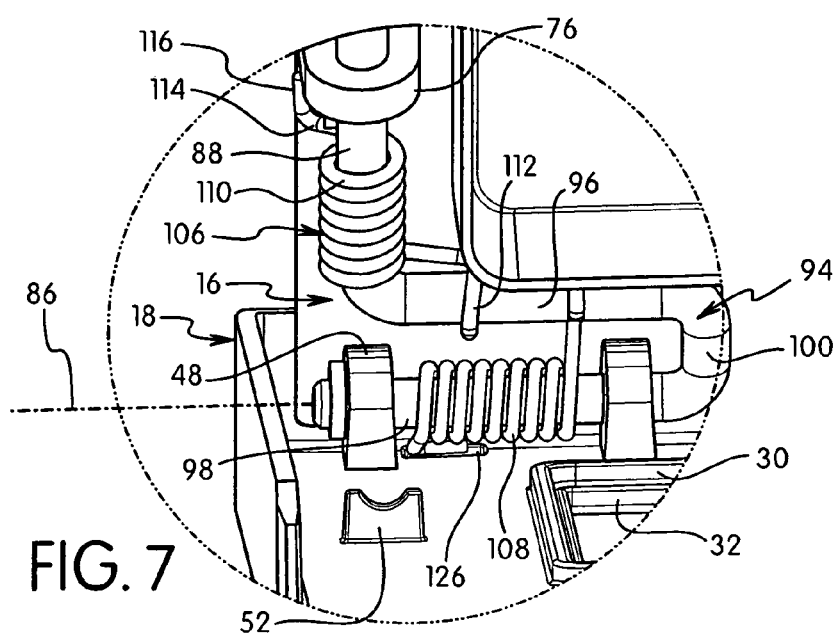
FIG. 7 is an enlarged view of the hinge assembly in one embodiment of the invention.

At least one spring is preferably used to pivot the cover selectively about the first axis 84 and second axis 86 with respect to the base 18. In a preferred embodiment of the invention, springs 106 and 108 are provided to bias the cover in the closed position about each axis of the hinge 16. The spring 106 in the embodiment shown is a coil spring having a body 110 with an axial passage that receives the first leg 88 of the hinge 16. The spring 106 has an end with a hook-like portion 112 that hooks onto the first portion 96 of the second leg 94 as shown in FIGS. 5, 6 and 7. A second end of the spring 106 includes a leg 114 that engages a stop member 116 on the bottom face of the cover 20 adjacent one of the bosses 76 as shown in FIG. 8. The spring 106 biases the cover 20 in a closed position about the axis 84 of the hinge.

A spring 108 has a similar shape and has a cylindrical body 118 with an axial passage for mounting on the second portion 98 of the second leg 94. The body 118 has an end with a hook-like member 120 for hooking onto the first portion 96 of the second leg 94 as shown in FIGS. 5, 6 and 7. The body 118 has a second end with a leg 122 with a hooked end portion 124. The hooked end portion 124 of the leg 122 is received in an opening 126 in the base 18 as shown in FIG. 9. The spring 106 has the respective ends engaging the cover and the first portion 96 of the spring to bias the cover in the closed position along the axis 84. The spring 108 has the respective ends engaging the base and the first portion 96 of the second leg 94 to bias the cover in the closed position along axis 86. In the embodiment shown, the springs 106 and 108 are coil springs although other shapes such as a leaf spring can be used to bias the cover to the closed position.

The construction and shape of the hinge and the springs as shown are one embodiment for mounting the cover to the base. Other dual axis hinge assemblies and triple axis hinge assemblies can also be used that allow the cover to pivot about at least two axes to allow mounting of the electrical box and cover assembly in different orientations. Various spring shapes can also be used to pivot the cover in the closed position. The dual axis hinge 16 is preferably spring biased by at least one spring to close the cover. A single spring can be used that is able to bias the cover closed about each axis of the hinge. The hinge allows the cover to close by gravity about each axis although at least one spring is preferably provided to ensure that the cover closes properly.

A second embodiment of the invention is shown in FIGS. 11-15. The weatherproof cover assembly 130 is similar to the weatherproof cover assembly 10 that enables the cover to pivot in two different directions depending on the orientation of the mounting of the cover assembly. Referring to the drawings, the cover assembly 130 includes a base 132, a cover 134 and a hinge assembly 136.

The cover assembly 130 is adapted for attaching to an electrical box and/or electrical wiring device for mounting as in the previous embodiment. For simplicity, the electrical box and wiring device are not shown.

Figure 11:
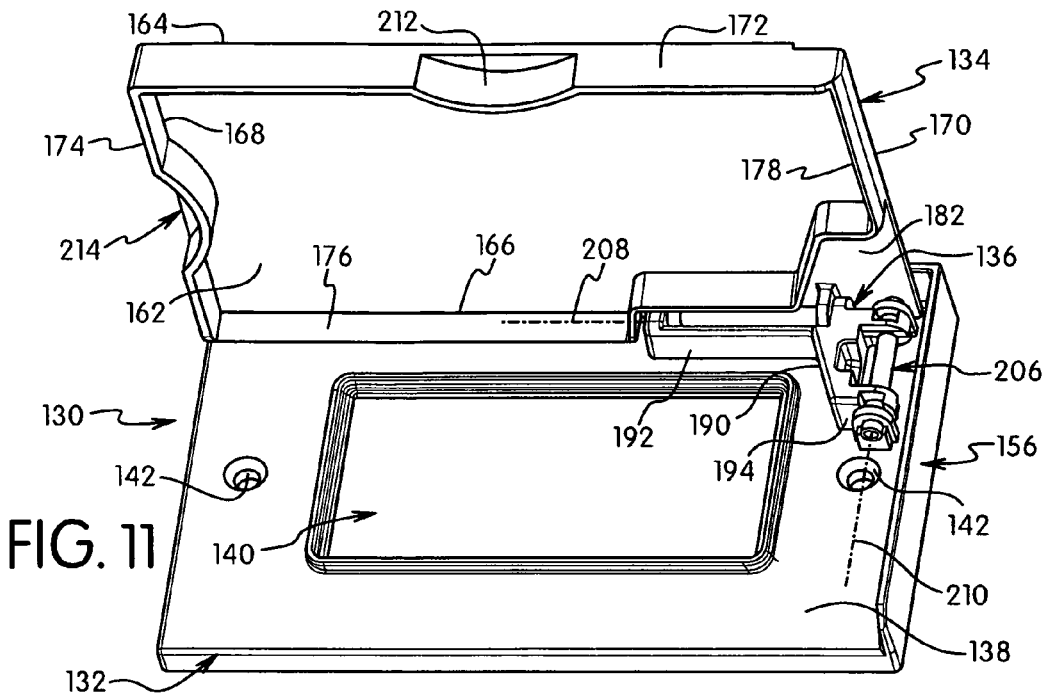
FIG. 11 is a top perspective view of the weatherproof cover assembly in a second embodiment of the invention.
Figure 12:
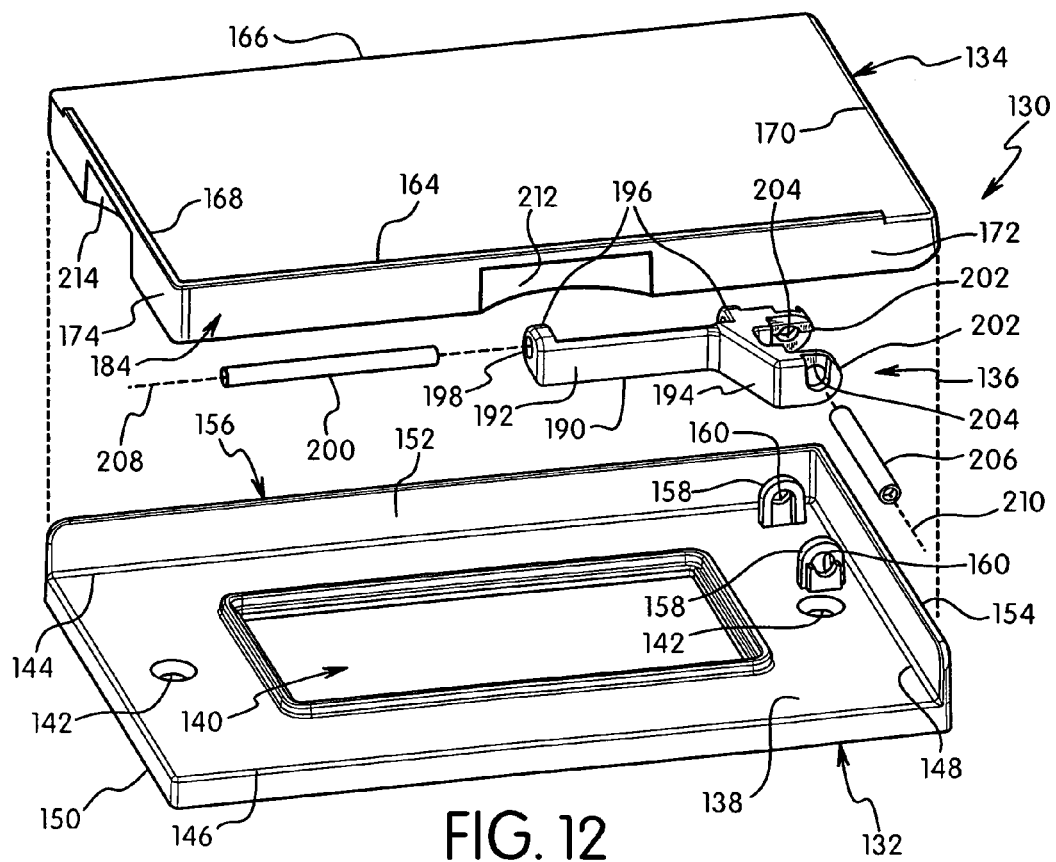
FIG. 12 is an exploded view of the cover assembly of FIG. 11.

The base 132 as shown in FIGS. 11 and 12 is similar to the base in the previous embodiment and has a substantially rectangular configuration with a top surface 138 having an opening 140 for receiving a wiring device and screw holes 142 for mounting the base 132 to the wiring device or the electrical box. A collar 141 extends from the base perpendicular to the top surface 138 and surrounds the opening 140 to divert rain water away from the opening 140. The base 132 has longitudinal sides 144 and 146 and transverse ends 148 and 150. The longitudinal side 144 includes a flange 152 and the transverse end 148 has a flange 154 to form a weatherproof shield 156. A pair of bosses 158 extend upwardly from the plane of the base 132 and include a hole 160. In the embodiment shown, the bosses 158 are positioned adjacent or near the flange 154 and the transverse side edge 148.

The cover 134 as shown in FIGS. 11 and 13 has a bottom surface 162, longitudinal sides 164 and 166, and transverse ends 168 and 170. The cover 134 has a shape and a dimension to complement the base 132.

Cover 134 has a flange 172 extending along the longitudinal side 164 and a flange 174 extending along the transverse end 168. A flange 176 extends along the longitudinal side 166 and a flange 178 extends along the transverse end 170. As shown in FIG. 13, a connecting flange 180 extends between the flange 176 and flange 178 and forms a recessed area 182 for the hinge assembly 136. The flanges 172, 174, 176, 178 and the connecting flange 180 form a continuous shield 184 with a dimension to encircle the opening 140 in the base 132 and the wiring device in the opening when the cover is in the closed position.

The cover 134 includes a pair of bosses 186 having a hole 188. The bosses 186 in the embodiment shown are positioned adjacent the longitudinal side 166 and are outside the enclosure formed by the shield 184.

The hinge assembly 136 includes a hinge insert 190 having a first leg 192 and a second leg 194 as shown in FIG. 14. First leg 192 includes a pair of bosses 196 having a hole 198 to receive a hinge pin 200. The second leg 194 also includes a pair of bosses 202 having holes 204 for receiving a hinge pin 206.

The hinge assembly 136 connects the cover 134 to the base 132 to allow the cover to pivot in two different directions along two different axes perpendicular to each other. The hinge assembly 136 forms a bidirectional hinge to enable the cover to pivot in the two directions. The bosses 196 of the hinge insert 190 are aligned with the bosses 186 on the cover and the hinge pin 200 is passed through the bosses 186, 196 to connect the hinge insert 190 to the cover 134. The bosses 202 on the second leg of the hinge insert are aligned with the bosses 158 on the base 132 and the pin 206 is inserted through the respective holes in the bosses 158, 202 to attach the hinge insert 190 to the base. The hinge assembly is a bidirectional hinge that enables the cover 134 to pivot along a first axis 208 shown in FIG. 11 when the cover assembly 130 is mounted in a horizontal orientation. The bidirectional hinge assembly 138 also enables the cover to pivot about a second axis 210 shown in FIG. 15 when the cover assembly is mounted in a vertical orientation. The cover in one embodiment includes a recessed area 212 in the flange 172 and a recessed area 214 in the flange 174 to form finger tabs for opening and closing the cover.

The hinge assembly 136 enables the cover assembly to be mounted in different orientations with the cover closing automatically by gravity. In other embodiments, a spring can be provided to bias the cover in the closed position. One or more springs 214, 216, similar to those described in the previous embodiment, can be used to automatically close the cover.

While various embodiments have been chosen to illustrate the invention, it will be understood by those skilled in the art that various changes and modifications can be made without departing from the scope of the invention as defined in the appended claims.

What is claimed is:

1. A weatherproof cover assembly, comprising:
  a base configured for coupling to an electrical box or electrical wiring device, said base having a screw hole positioned to align with a mounting screw in the electrical box and to couple the base to the electrical box and an opening extending between a top face and a bottom face and having a dimension for receiving the electrical wiring device;
  a first flange extending from the plane of said base and extending along a first side of said base; and
  a second flange joined to said first flange and extending from the plane of said base and extending along a second side of said base,
  said first and second flanges positioned to direct rain water away from said electrical wiring device and said opening in said base,
  a movable cover member to mate with said base to cover said opening in said base and said electrical wiring device when said cover is in a closed position; and
  a one-piece hinge member having a substantially L-shape with a first leg and a second leg extending substantially perpendicular from said first leg, said first leg being pivotally connected to said cover member to enable said cover to pivot between an open position and a closed position about a first axis, and said second leg pivotally connected to said base to enable said cover to pivot between an open position and a closed position about a second axis, a continuous wall extending outwardly from a plane of said cover and having a dimension to encircle said opening in said base when said cover is in said closed position, said continuous wall positioned between said opening in said base and said first and second flanges on said base and between said opening and hinge member to direct rain water away from said opening in said base, and said hinge member being positioned between said first and second flanges on said base and said continuous wall on said cover, said cover assembly being adapted for mounting in a horizontal orientation or in a vertical orientation where said cover can be closed downwardly when said assembly is mounted in said horizontal orientation or said vertical orientation.

2. The cover assembly of claim 1, wherein
said base has a first side and a first end, said first end having a first hinge support with a first hinge hole coupled to and receiving said first leg of said hinge member; and
said cover has a first side and a first end, said first side having a second hinge support with a second hinge hole coupled to and receiving said second leg of said hinge member.

3. The cover assembly of claim 2, wherein
said second leg of said hinge member has a first portion and a second portion substantially parallel to said first portion and forming a substantially U-shape, said first portion being coupled to said first leg, and said second portion being coupled to said first hinge support of said base.

4. The cover assembly of claim 3, wherein
said second portion of said second leg is coupled to said first portion of said second leg of said hinge member.

5. The cover assembly of claim 3, further comprising
a first spring coupled to said first leg and biasing said cover to pivot about said first axis to a closed position; and
a second spring coupled to said first member of said second leg and biasing said cover to pivot about said second axis to a closed position.

6. The cover assembly of claim 3, further comprising
a first spring having a first leg engaging said cover and a second leg engaging said first portion of said second leg of said hinge member to bias said cover to a closed position about said first axis; and
a second spring having a first leg engaging said base and a second leg engaging said first portion of said second leg of said hinge member to bias said cover to a closed position about said second axis.

7. The cover assembly of claim 1, further comprising
at least one spring member to bias said cover to pivot about said first axis to a closed position and to bias said cover to pivot about said second axis to a closed position.

8. The cover assembly of claim 1, wherein said assembly further comprises
a first hinge boss with a hinge hole coupled to said cover, a first hinge pin rotatably coupled to said first leg and rotatably connected to and received in said hinge hole of said first hinge boss of said cover to pivot said cover about said first axis; and a second hinge boss with a hinge hole coupled to said base, a second hinge pin rotatably connected to said second leg and rotatably connected to and received in said hinge hole of said second hinge boss to pivot said hinge member and cover about said second axis.

9. The cover assembly of claim 1, further comprising
an electrical box and an electrical wiring device mounted in said electrical box, said cover assembly coupled to said electrical box with said electrical wiring device extending through said opening in said base.

10. A weatherproof cover assembly, comprising:
a base configured for coupling to an electrical box or an electrical wiring device, said base having an opening extending between a top face and a bottom face and having a dimension for receiving the electrical wiring device, a first side, and a first end, said first side having a first hinge support with a first hinge hole;
a movable cover to mate with said base and to cover said opening and electrical wiring device when said cover is in a closed position, said cover having a first side aligned with said first side of said base, and a first end aligned with said first end of said base, said first end of said cover having a second hinge support with a second hinge hole; and
a hinge member having a first leg and a second leg integrally formed with said first leg, said first leg being received in said second hinge hole and pivotally coupled to said second hinge support of said cover for pivoting said cover about a first axis, and said second leg having a U-shape formed by a first portion and a second portion being substantially parallel to said first portion,
said first portion being coupled to said first leg, and
said second portion having one end coupled to said first portion and being rotatably coupled to and received in said hinge hole of said first hinge support of said base, and defining said second axis for pivoting said cover about said second axis,
a first spring on said first leg of said hinge member for biasing said cover to a closed position about said first axis, said first spring having a first end engaging said cover and a second end engaging said first portion of said second leg, and
a second spring on said second portion of said second leg for biasing said cover to a closed position about said second axis, said second spring having a first end engaging said base and a second end engaging said first portion of said second leg,
said cover assembly being adapted for mounting in a horizontal orientation or in a vertical orientation.

11. The cover assembly of claim 10, wherein
said hinge member has a substantially L-shape.

12. The cover assembly of claim 10, wherein
said first leg of said hinge member is substantially perpendicular to said second leg.

13. The cover assembly of claim 10, further comprising
a flange extending along said first side and first end of said base, and extending outwardly from a plane of said base, and
a continuous wall extending outwardly from a plane of said cover and having a dimension to encircle said opening in said base and positioned between said opening and said hinge member when said cover is in said closed position.

14. The cover assembly of claim 13, wherein
said hinge member is positioned between said flange of said base and said continuous wall of said cover.

15. A weatherproof cover assembly for an electrical wiring device, said cover assembly comprising:

a base configured for coupling to an electrical box or to the electrical wiring device, said base having an opening extending between a top face and a bottom face and having a dimension to receive the electrical wiring device, a first side, and a first end, said first side having a first hinge support with a first hinge hole;

a movable cover to mate with said base and to cover the electrical wiring device and the opening in said base when in a closed position, said cover having a first side aligned with said first side of said base and first end aligned with said first end of said base, said first end of said cover having a second hinge support with a second hinge hole; and a hinge member having a first leg received in said first hinge hole pivotally coupled to said first hinge support about a first axis, said first leg having a first free end and a second end, said hinge member further including a second leg integrally formed with said first leg oriented substantially perpendicular to said first leg, said second leg having a substantially U-shape with a first portion and a second portion parallel to said first portion, said first and second portions being substantially perpendicular to said first leg, and said second portion being received in said second hinge hole and pivotally coupled to said second hinge support about a second axis;

said cover assembly being adapted for mounting in a horizontal orientation or a vertical orientation and where said cover can close downwardly when said cover assembly is mounted in said horizontal orientation or vertical orientation.

16. The cover assembly of claim 15, further comprising a first spring on said first leg and having a first end engaging said cover and a second end engaging said first portion of said second leg to bias said cover about said first axis to a closed position.

17. The cover assembly of claim 15, further comprising a second spring on said second portion of said second leg and having a first end engaging said base and a second end engaging said first portion to pivot said cover about said second axis.

18. The cover assembly of claim 15, wherein said cover pivots about said first axis with respect to said first leg and said base, and said cover and said hinge member pivot about said second axis.

* * * * *